United States Patent
Menger et al.

(10) Patent No.: US 10,940,823 B2
(45) Date of Patent: Mar. 9, 2021

(54) OCCUPANT PROTECTION DEVICE FOR A MOTOR VEHICLE AND MOTOR VEHICLE

(71) Applicant: Volkswagen Aktiengesellschaft, Wolfsburg (DE)

(72) Inventors: Ralf Menger, Braunschweig (DE); Viktor Gruenwald, Wolfsburg (DE); Frank Heuer, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 43 days.

(21) Appl. No.: 16/590,991

(22) Filed: Oct. 2, 2019

(65) Prior Publication Data
US 2020/0101925 A1    Apr. 2, 2020

(30) Foreign Application Priority Data
Oct. 2, 2018   (DE) .................... 10 2018 216 961.6

(51) Int. Cl.
  *B60R 21/232*  (2011.01)
  *B60R 13/02*   (2006.01)
  (Continued)

(52) U.S. Cl.
  CPC ........ *B60R 21/216* (2013.01); *B60R 13/0212* (2013.01); *B60R 21/213* (2013.01);
  (Continued)

(58) Field of Classification Search
  CPC ..... B60R 21/216; B60R 21/26; B60R 21/213; B60R 21/214; B60R 21/237;
  (Continued)

(56) References Cited

U.S. PATENT DOCUMENTS

| 5,931,493 A | 8/1999 | Sutherland |
| 6,402,188 B1 | 6/2002 | Pasch |

(Continued)

FOREIGN PATENT DOCUMENTS

| DE | 10039802 A1 * | 2/2002 | ........... B60R 21/213 |
| DE | 102004032668 A1 | 2/2005 | |

(Continued)

*Primary Examiner* — Ruth Ilan
*Assistant Examiner* — Daniel M. Keck
(74) *Attorney, Agent, or Firm* — Muncy, Geissler, Olds & Lowe, P.C.

(57) ABSTRACT

An occupant protection device for a motor vehicle, having an airbag deploying as a result of propellant gas pressurization and extending along a lateral roof rail connecting vehicle pillars of the vehicle body, and having a roof liner mounted on the vehicle body, wherein a storage space for the folded airbag is formed between the roof rail and the roof liner. Advantageously, the airbag and the roof liner extend at least into the region of a vehicle rear-side and/or a vehicle front-side vehicle pillar, wherein the roof liner is adjustably mounted on the vehicle body toward the vehicle interior at least in the region of the relevant vehicle pillar in such a way that in the region of this vehicle pillar, the roof liner opens up both a first exit region from the storage space toward the bottom of the vehicle and a second exit region from the storage space toward the top of the vehicle for the airbag deploying as a result of propellant gas pressurization.

9 Claims, 3 Drawing Sheets

(51) Int. Cl.
  *B60R 21/213* (2011.01)
  *B60R 21/216* (2011.01)
  *B60R 21/26* (2011.01)
  *B60R 21/237* (2006.01)

(52) U.S. Cl.
  CPC ............ *B60R 21/232* (2013.01); *B60R 21/26* (2013.01); *B60R 21/237* (2013.01)

(58) Field of Classification Search
  CPC ........ B60R 2013/0287; B60R 13/0212; B60R 21/215; B60R 21/232
  See application file for complete search history.

(56) References Cited

U.S. PATENT DOCUMENTS

| | | | |
|---|---|---|---|
| 8,393,642 B2 | 3/2013 | Nakaya et al. | |
| 9,016,717 B1 | 4/2015 | Clauser et al. | |
| 9,586,554 B1 | 3/2017 | Baer et al. | |
| 9,821,747 B2 | 11/2017 | Benedetti | |
| 2004/0090050 A1 | 5/2004 | Dominissini et al. | |
| 2004/0164525 A1 | 8/2004 | Gray et al. | |
| 2006/0290122 A1 | 12/2006 | Woydick | |
| 2007/0096440 A1 | 5/2007 | Purvis et al. | |
| 2007/0176400 A1 | 8/2007 | Kamano | |
| 2008/0116670 A1* | 5/2008 | Card | B60R 21/232 280/730.2 |
| 2009/0194978 A1 | 8/2009 | Miura | |
| 2013/0069346 A1 | 3/2013 | Williams et al. | |
| 2015/0130174 A1 | 5/2015 | Gillay | |
| 2016/0176378 A1 | 6/2016 | Thomas, Jr. | |
| 2017/0247009 A1* | 8/2017 | Konaka | B60R 21/232 |
| 2019/0001913 A1* | 1/2019 | Okuhara | B60R 21/232 |
| 2019/0275977 A1* | 9/2019 | Lee | B60R 21/232 |

FOREIGN PATENT DOCUMENTS

| | | |
|---|---|---|
| DE | 60313337 T2 | 1/2008 |
| DE | 102007000343 A1 | 3/2008 |
| DE | 102009005900 A1 | 7/2010 |
| DE | 102009033022 A1 | 3/2011 |
| DE | 102011012075 A1 | 1/2012 |
| EP | 0872388 A2 | 10/1998 |
| EP | 0943501 A2 | 9/1999 |
| EP | 2957467 A1 | 12/2015 |
| EP | 3204262 A1 | 8/2017 |
| GB | 2517575 * | 2/2015 |
| JP | 4655050 B2 * | 3/2011 |
| JP | 2012017045 A | 1/2012 |

* cited by examiner

OCCUPANT PROTECTION DEVICE FOR A MOTOR VEHICLE AND MOTOR VEHICLE

This nonprovisional application claims priority under 35 U.S.C. § 119(a) to German Patent Application No. 10 2018 216 961.6, which was filed in Germany on Oct. 2, 2018, and which is herein incorporated by reference.

BACKGROUND OF THE INVENTION

Field of the Invention

The present invention relates to an occupant protection device for a motor vehicle and to a motor vehicle with such an occupant protection device.

Description of the Background Art

For the purposes of the present description, the usual direction of travel of a motor vehicle shall be designated as "−x" ("minus x"), the direction contrary to its usual direction of travel with "+x" ("plus x"), starting from the usual direction (−x) the direction in the horizontal transverse to the x-direction viewed to the right as "+y", starting from the usual direction of travel (−x) the direction in the horizontal transverse to the x-direction viewed to the left as "−y", the vertical direction viewed transversely to the x-direction upwards as "+z", and the vertical direction viewed transversely to the x-direction downwards as "−z". This designation of the spatial directions in Cartesian coordinates corresponds to the coordinate system commonly used in the automotive industry. Moreover, terms such as "front", "rear", "top", "bottom", and terms of similar meaning, including the terms "right" and "left" are used in the manner commonly used to designate direction for a motor vehicle.

In the vehicle industry, occupant protection devices have been known for some time which have one or more airbags that are triggered by a sensor in the event of a crash, thus protecting the vehicle occupant from bodily injury or at least minimizing it. An airbag is understood to be a gas bag that is transferred from a folded initial position to a deployed, inflated condition as a result of pressurization by propellant gas, on which then in the event of said crash at least one body part of an affected vehicle occupant is braced. In practice, airbags are arranged in a variety of locations in the passenger compartment. In addition to driver and passenger airbags, for example, side airbags in the door trim and/or in the vehicle seat, knee airbags, belt airbags and so-called curtain airbags are known. The invention relates to the latter.

In that regard, DE 10 2009 005 900 A1 discloses an occupant protection device with a so-called head-side airbag with several inflatable chambers, which airbag is housed in the roof frame trim of the vehicle and which in the event of a lateral collision of the vehicle deploys along the side windows into the passenger compartment towards the bottom of the vehicle or vertically to protect a vehicle occupant from an impact with vehicle-mounted components. Along the lower edge portion of the airbag, a tether extends, which runs between an fixing point immovably provided on an A-pillar of the vehicle and a likewise immovably arranged fixing point on a D-pillar of the vehicle. On the vehicle side, the tether is held exclusively at said fixing points. For reliable fixation of the inflated airbag, the tether is also immovably attached to the inflatable chambers of the airbag.

As occupant protection devices, US 2007/0096440 A1 discloses a roof liner arrangement for a vehicle with a roof liner and an inflatable airbag. The roof liner has a front portion and a rear portion and is configured such that it extends below the air bag. The airbag is further configured to extend downward along one side of the vehicle when being inflated. The rear portion of the roof liner is connected to a rear part of the vehicle by means of the tether in such a manner that the tether controls the movement of the roof liner during the deployment of the airbag. In particular, it is provided that the tether cooperates with the roof liner to define a hinge line on the roof liner in the vicinity of a side edge, such that the roof liner is bendable along the hinge line during deployment of the airbag. The roof liner is intended to direct the deployment of the airbag toward the bottom of the vehicle and toward the side of the vehicle.

The invention is based on the fact that due to a currently favored design of motor vehicles, in particular of passenger cars, the rear of the same becomes wider towards the bottom and thus, the head of a rear passenger is relatively close to a rear vehicle pillar and the vehicle roof. In this regard, there is a need to further improve and optimize personal safety, in particular protecting the vehicle occupants' heads.

SUMMARY OF THE INVENTION

It is therefore an object of the present invention to provide an occupant protection device which further improves the conventional art and thus achieves even further increased protection of the vehicle occupant's head. It is another object of the invention to provide a motor vehicle with such an occupant protection device.

Based on an occupant protection device for a motor vehicle, having an airbag deployable as a result of propellant gas pressurization and extending along a lateral roof rail which connects vehicle pillars of the vehicle body, and with a roof liner mounted on the vehicle body, wherein a storage space for the folded airbag is formed between the roof rail and the roof liner and wherein the roof liner is adjustably mounted on the vehicle body such that said roof liner opens up an exit region for the airbag deploying as a result of the propellant gas pressurization from the storage space toward the bottom of the vehicle, the object is achieved in that the airbag and the roof liner at least extend into the area of a vehicle rear-side and/or a vehicle front-side vehicle pillar, and the roof liner is adjustably mounted at least in the area of the respective vehicle pillar on the vehicle body such that the roof liner opens up both a first exit region from the storage space toward the bottom of the vehicle and a second exit region from the storage space toward the top of the vehicle in the area of said vehicle pillar for the airbag deploying as a result of the propellant gas pressurization.

As such, the scope of protection for the head of the respective vehicle occupants, in particular rear passengers, is advantageously extended, namely extended toward the top of the vehicle. Therefore, in addition to the conventional head protection at the height of the window of the motor vehicle, head protection is also provided beyond that, namely above said window at the height of the roof rail and the vehicle roof of the motor vehicle as well as in the adjacent area of an adjacent vehicle pillar.

Accordingly, it is advantageously provided that in the region of the respective vehicle pillar, the roof liner has two fixing points for connecting the roof liner to the vehicle body by means of a respective tether. By this measure, it is advantageously possible to direct the roof liner moving away from the vehicle body toward the vehicle interior as a result of the deploying airbag, such that it simultaneously provides the first exit region for the airbag toward the bottom of the vehicle and the second exit region toward the top of the vehicle from said storage room.

To be able to control the movement of the roof liner and the exit behavior of the inflating airbag from the storage space in a defined manner, it is particularly provided that the fixing points of the roof liner are spaced apart from another as viewed in the transverse direction of the relevant vehicle pillar.

The defined movement of the roof liner in the area of the relevant vehicle pillar toward the interior of the vehicle and the required spacing thereof to the vehicle body for deployment of the airbag both towards the bottom of the vehicle and the top of the vehicle can be determined by the chosen length of the tethers and the way they are connected to the roof liner and the vehicle body.

In order to optimize the deployment behavior of the airbag, it is provided that the tethers are dimensioned such and connected at one end to the associated fixing point of the roof liner and at the other end to the vehicle body in such a manner that due to the deploying airbag, the roof liner adjusting in the area of the relevant vehicle pillar toward the vehicle interior as viewed in the transverse direction of the vehicle pillar is raised uniformly on both sides from the vehicle pillar. The term uniform is to be understood that in the area essential to the invention, namely in the area of the relevant vehicle pillar, contrary to the prior art, the roof liner largely performs no movement about a longitudinal axis, but instead, as viewed in the transverse direction of the vehicle pillar, is uniformly raised on both sides from the vehicle pillar toward the vehicle interior and thus provides the two exit regions for the inflating airbag.

A functionally reliable embodiment of the invention can be achieved in that the airbag in the folded state is arranged between the two fixing points of the roof liner.

In order to minimize the assembly effort, the tethers preferably have a common attachment point to the vehicle body. However, the invention is not limited to this embodiment of the invention, but also covers an alternative embodiment in which the tethers each have a separate attachment point to the vehicle body.

So as to provide the respective vehicle occupant a defined scope of protection for the head, in particular also towards the top of the vehicle, the airbag has at least one transverse extension or forms such a transverse extension in the region of the relevant vehicle pillar, which during deployment exits from the storage room towards the top of the vehicle.

The invention also relates to a motor vehicle with an occupant protection device of the type described above.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
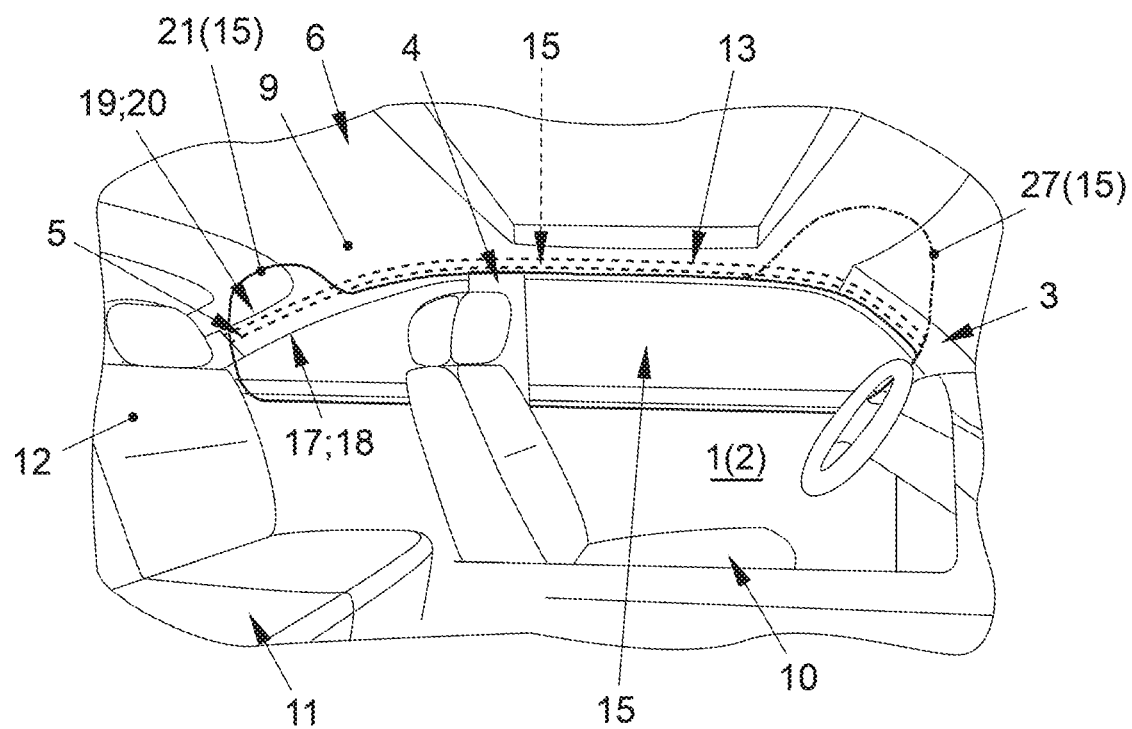
FIG. 1 is an extremely schematized interior view of the passenger compartment of a motor vehicle equipped with an occupant protection device according to the invention, wherein an airbag of the occupant device is shown both in a folded and in a deployed, inflated state.
Figure 2:
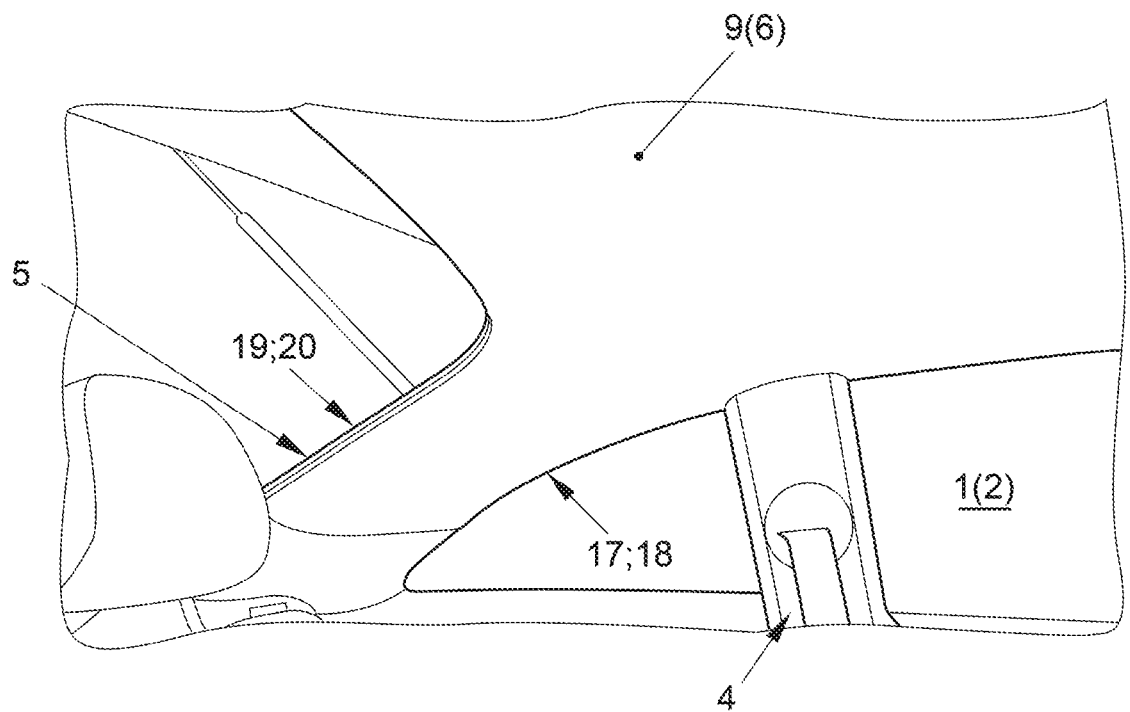
FIG. 2 shows the passenger compartment of FIG. 1 with a view from the vehicle interior to a rear vehicle pillar including an associated roof liner portion.

FIG. 1 shows an interior view of the passenger compartment 1 of a motor vehicle 2, in the present case of a passenger vehicle, with a view from inside the vehicle to the left side of the motor vehicle 2. On each side as viewed from the front of the vehicle to the rear of the vehicle, the motor vehicle 2 has a first front, i.e., vehicle front-side, vehicle pillar 3, also referred to as the A-pillar, a second, middle vehicle pillar 4, also referred to as the B-pillar, and a third, rear, i.e., vehicle rear-side, vehicle pillar 5, also referred to as the C-pillar. For the sake of simplicity, of these vehicle pillars 3, 4, 5, as already shown above, only the vehicle pillars 3, 4, 5 of the left side of the vehicle are shown. A lateral roof rail 7 of the vehicle body 8 shown in FIG. 3 and bearing a vehicle roof 6 connects the vehicle pillars 3, 4, 5 with each other. Within the passenger compartment 1, the vehicle roof 6 has a so-called roof liner 9, which is also occasionally referred to in the art as a headliner (cf., FIGS. 1, 2, 4, 5). According to this embodiment, the roof liner 9 extends both to the front vehicle pillar 3 (A-pillar) and the rear vehicle pillar 3 (C-pillar). In addition, FIG. 1 also shows a driver's seat 10 of a front row of seats and a rear bench seat 11, the backrest 12 of which is arranged in the area of the rear vehicle pillar 5.

Figure 3:
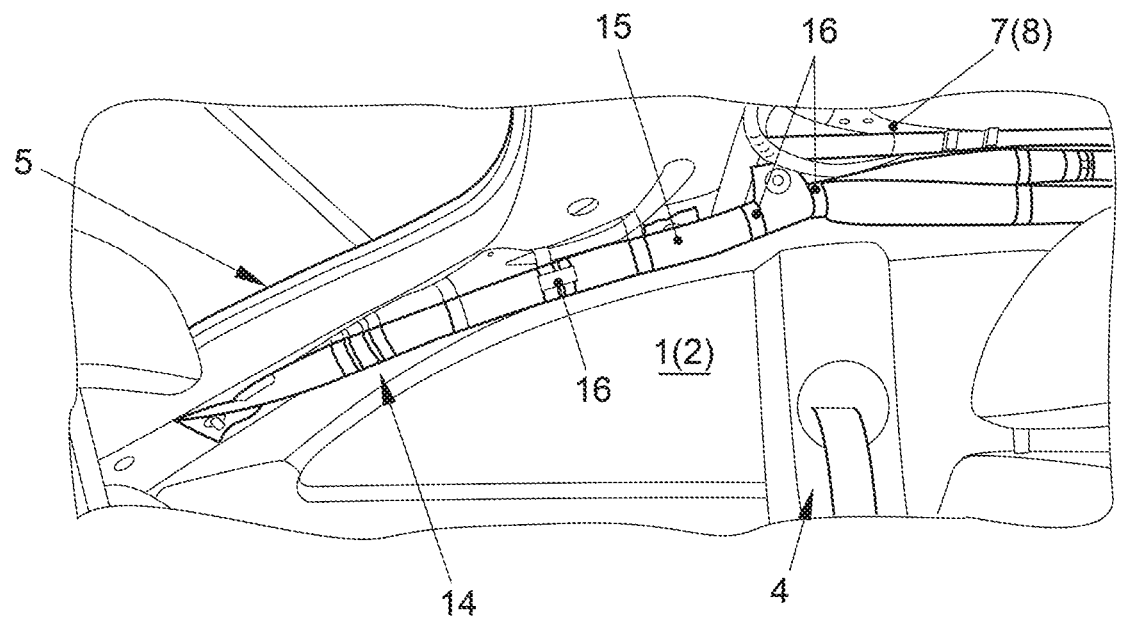
FIG. 3 shows the vehicle pillar of FIG. 2 without a roof liner, with a view to an airbag disposed below the roof liner and attached to the vehicle body as well as deployable by means of propellant gas.
Figure 4:
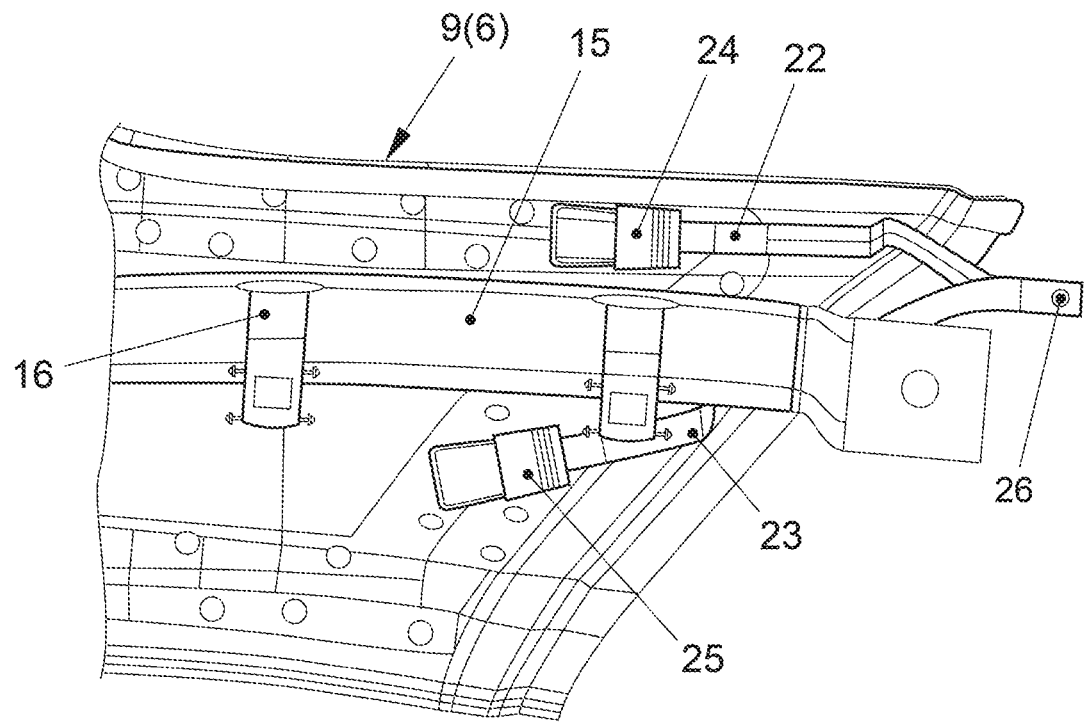
FIG. 4 shows an interior view of the roof liner portion of the vehicle pillar of FIGS. 2 and 3 including the airbag in the folded state arranged in the storage space formed between the roof liner and the vehicle body.

The vehicle 2 further includes an occupant protection device 13. This has a storage space 14 formed between the roof rail 7 and the roof liner 9, in which a folded airbag 15 is arranged (c.f. FIG. 4). The airbag 15 is can be deployed or inflated by pressurization with propellant gas. FIG. 1 shows the airbag 15 very schematically both in a folded state (dashed lines) and in a deployed, inflated state (solid lines). FIG. 3 shows said airbag 15 also in the folded state and fixed to the vehicle body 8 or to its roof rail 7. According to this exemplary embodiment, the airbag 15 extends from the front vehicle pillar 3 (A-pillar) along the roof rail 7 to the rear vehicle pillar 5 (C-pillar), specifically up to at least a region of the rear vehicle pillar 5, where usually the head of a rear passenger, not shown in the drawing, is positioned who is sitting on the seat 11.

In the event of deployment, the folded airbag 15 is non-releasably attached to the vehicle body 8 at both ends and in between by means of a plurality of releasable fasteners 16. The fasteners 16, for example, may comprise releasable hook and loop fasteners (c.f. FIGS. 3 and 4).

Figure 5:
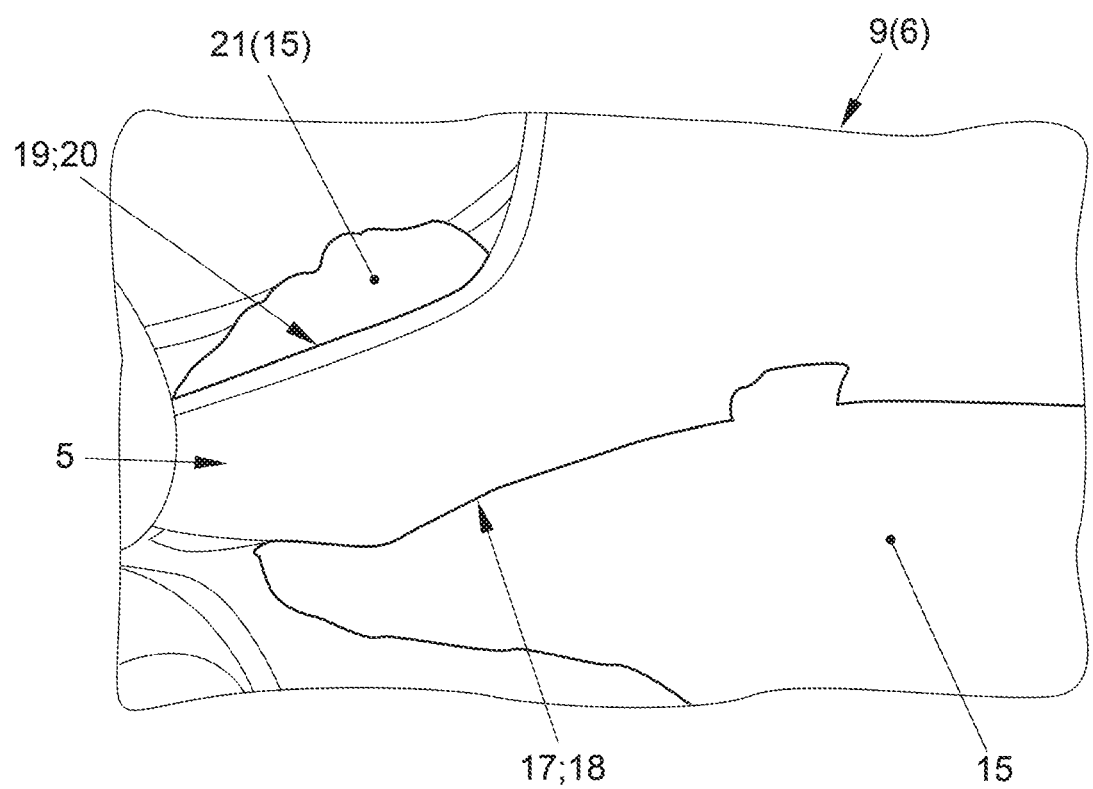
FIG. 5 shows the passenger compartment of FIG. 1 with a view from the vehicle interior to said rear vehicle pillar including the associated roof liner portion with deployed airbag.

As regards the present embodiment, the roof liner 9 is mounted adjustably to the vehicle body 8 in the entire extension region of the airbag 15 in such a way that this airbag 15 deploying as a result of said propellant gas pressurization opens up a first exit region 17 for the same from the storage space 14 towards the bottom of the vehicle into the passenger compartment 1. That is, the first exit region 17 is formed on a lower edge 18 of the roof liner 9 which delimits the storage space 14. In the deployed, inflated condition, the airbag 15 extends beyond said edge 18 like a curtain towards the bottom of the vehicle (c.f. FIGS. 1 and 5).

In the area of the rear vehicle pillar 5, the roof liner 9 forms a top edge 19 delimiting the storage space 14 toward the top of the vehicle. At least in the area of the rear vehicle pillar 5, the roof liner 9 is adjustably mounted on the vehicle body 8 such that this airbag 15 deploying as a result of said propellant gas pressurization additionally opens up a second exit area 20 for the same from the storage space 14 towards the top of the vehicle into the passenger compartment 1. In this regard, the airbag 15 has a transverse extension 21 or forms such a transverse extension 21 (c.f. FIGS. 1 and 5) in the region of the rear vehicle pillar 5 which exits toward or is directed toward the top of the vehicle from the storage space 14 in the event of deployment.

As already stated above, said exit regions 17, 20 are effected by a defined adjustment of the roof liner 9 toward the vehicle interior as a result of propellant gas pressurization of the airbag 15 and the deployment or inflation of the latter. In order to definedly delimit the movement of the roof liner 9 and furthermore the exit regions 17, 20, the roof liner 9 is connected to the vehicle body 8 in the area of the rear vehicle pillar 5 by means of tethers 22, 23. According to FIG. 4, two tethers 22, 23 are provided, which at one end are fixed in each case at a fixing point 24, 25 of the roof liner 9 to the latter, and at the other end at a common attachment point 26 to the vehicle body 8. The illustration of the vehicle body 8 has been omitted for the sake of clarity.

As can also be seen from FIG. 4, the fixing points 24, 25 are arranged at a distance from each other when viewed in the vertical direction of the vehicle (z-direction). The folded airbag 15 is disposed between the two fixing points 24, 25. The advantages of such an arrangement have already been described above. In this embodiment, the tethers extend 22, 23 starting from the roof liner 9, substantially V-shaped to said point of attachment 26 on the vehicle body 8. As shown here, the point of attachment 26 is preferably disposed outside of the roof liner 9 on the rear vehicle pillar 5 of the vehicle body 8.

However, the invention is not limited to this embodiment of the invention, but also includes tethers 22, 23 which are fixed to the vehicle body 8, spaced from each other in non-illustrated separate attachment points 26 and extend side by side, for example parallel with one another (not shown in the drawing).

Said defined movement of the roof liner 9 in the region of the rear vehicle pillar 5 toward the vehicle interior and the required spacing thereof to the vehicle body 8 for deployment of the airbag 15 both toward the bottom of the vehicle and the top of the vehicle is substantially determined by the choice of length of the tethers 22, 23 and their connection to the roof liner 9 and the vehicle body 8.

Preferably, the tethers 22, 23 are dimensioned and attached at one end to the associated fixing point 24, 25 of the roof liner 9 and at the other end, to a common attachment point 26, or separate attachment point 26 (not shown in the drawing) of the vehicle body 8 in such a way that the roof liner 9 adjusting in the area of the rear vehicle pillar 5 toward the vehicle interior is uniformly adjusted due to the airbag 15 deploying as a result of said propellant gas pressurization. A uniform adjustment of the roof liner 9 is to be understood that in the range essential to the invention, namely in the area of the vehicle rear side or rear vehicle pillar 5, said roof liner mostly does not move about a longitudinal axis, contrary to the prior art, but instead is evenly raised up from the rear vehicle pillar 5 toward the vehicle interior, as viewed in the transverse direction of the rear vehicle pillar 5, thus providing the two exit regions 17, 20 for the inflating airbag 15.

The above embodiment focuses on the area of the vehicle rear side or the rear vehicle pillar 5 (C-pillar), which is equipped with the occupant protection device 13 according to the invention. However, it is considered advantageous to additionally or alternatively also provide the occupant protection device 13 according to the invention in the area of the vehicle front side or the front vehicle pillar 3 (A-pillar). FIG. 1 shows a transverse extension 27 (dash-dotted lines) directed towards the top of the vehicle of the deployed and inflated airbag 15 in the area of the front vehicle pillar 3 (A-pillar). By virtue of this measure, an area of the motor vehicle 1 arranged above the front vehicle pillar 3 (A-pillar) is therefore also advantageously covered by means of the inflated airbag 15.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An occupant protection device for a motor vehicle, the device comprising:
   an airbag deployable as a result of propellant gas pressurization and extending along a lateral roof rail connecting vehicle pillars of the vehicle body;
   a roof liner mounted on the vehicle body; and
   a storage space for the folded airbag being formed between the roof rail and the roof liner,
   wherein the roof liner is adjustably mounted on the vehicle body such that the airbag deploying as a result of said propellant gas pressurization opens up an exit region for the same from the storage space toward the bottom of the vehicle,
   wherein the airbag and the roof liner extend at least into a region of a vehicle rear-side and/or a vehicle-front side vehicle pillar, and
   wherein, in an area of the relevant vehicle pillar, the roof liner is adjustably mounted on the vehicle body toward the vehicle interior such that in the region of this vehicle pillar, the roof liner opens up both a first exit region from the storage space toward the bottom of the vehicle and a second exit region from the storage space toward the top of the vehicle for the airbag deploying due to the propellant gas pressurization.

2. The occupant protection device according to claim 1, wherein, in the region of the respective vehicle pillar, the roof liner has two fixing points for the attachment of the roof liner to the vehicle body via a tether.

3. The occupant protection device according to claim 2, wherein the fixing points of the roof liner are arranged spaced from each other as viewed in a transverse direction of the respective vehicle pillar.

4. The occupant protection device according to claim 2, wherein, for the deployment of the airbag toward the bottom of the vehicle and the top of the vehicle, the movement of the roof liner in the region of the relevant vehicle pillar toward the vehicle interior and the required spacing thereof to the vehicle body is determined by a predetermined length of the tethers and their attachment to the roof liner and the vehicle body.

5. The occupant protection device according to claim 2, wherein the tether is dimensioned such and connected at one end to the associated fixing point of the roof liner and at the other end to the vehicle body such that as a result of the deploying airbag, the roof liner adjusting toward the vehicle interior in the region of the relevant vehicle pillar is raised uniformly on both sides from the vehicle pillar as viewed in the transverse direction of the vehicle pillar.

6. The occupant protection device according to claim 2, wherein, in the folded state, the airbag is arranged between the two fixing points of the roof liner.

7. The occupant protection device according to claim 2, wherein the tethers have a common or a separate attachment point to the vehicle body.

8. The occupant protection device according to claim 1, wherein, in the region of the relevant vehicle pillar, the airbag has or forms at least one transverse extension exiting from the storage space toward a top of the vehicle in the event of deployment.

9. A motor vehicle comprising an occupant protection device according to claim 1.

* * * * *